US012613086B2

(12) United States Patent
Huang et al.

(10) Patent No.: US 12,613,086 B2
(45) Date of Patent: Apr. 28, 2026

(54) FIVE-AXIS SPACE PRECISION MEASUREMENT FIXTURE

(71) Applicant: INDUSTRIAL TECHNOLOGY RESEARCH INSTITUTE, Hsinchu (TW)

(72) Inventors: Yu-Shiang Huang, Taichung (TW); Yung-Chao Chan, Taichung (TW); Shih-Chieh Lo, Yuanlin City (TW); Chin-Mou Hsu, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 391 days.

(21) Appl. No.: 18/520,723

(22) Filed: Nov. 28, 2023

(65) Prior Publication Data

US 2025/0116496 A1 Apr. 10, 2025

(30) Foreign Application Priority Data

Oct. 5, 2023 (TW) .................................. 112138224

(51) Int. Cl.
| | |
|---|---|
| *G01B 5/008* | (2006.01) |
| *B23Q 17/22* | (2006.01) |
| *G01B 21/04* | (2006.01) |

(52) U.S. Cl.
CPC ............. *G01B 5/008* (2013.01); *B23Q 17/22* (2013.01); *G01B 21/045* (2013.01)

(58) Field of Classification Search
CPC ............................... G01B 21/045; B25Q 17/22
(Continued)

(56) References Cited

U.S. PATENT DOCUMENTS

| | | | | |
|---|---|---|---|---|
| 3,537,697 A | * | 11/1970 | Davis | ........................ B25H 7/00 269/65 |
| 3,711,929 A | * | 1/1973 | Blakey | .................. H01F 7/0252 269/276 |

(Continued)

FOREIGN PATENT DOCUMENTS

| | | |
|---|---|---|
| CN | 1824461 B | 8/2010 |
| CN | 101976057 B | 12/2012 |

(Continued)

OTHER PUBLICATIONS

Taiwan Patent Office, "Office Action", May 27, 2024, Taiwan.
(Continued)

*Primary Examiner* — George B Bennett
(74) *Attorney, Agent, or Firm* — Troutman Pepper Locke LLP; Tim Tingkang Xia, Esq.

(57) ABSTRACT

A five-axis space precision measurement fixture includes a body, screw holes to install first balls and second balls. The body has a first surface, a second surface, a third surface and an inclined surface located with respect to the third surface between the first surface and the second surface. The first surface and the second surface are parallel to each other and are located on opposite sides of the third surface. An included angle between the inclined surface and the third surface is 45 degree. The first balls are equal-spacing into columns and rows on the first surface, and each of the first balls is protruded from the first surface along a first direction. The second balls are also equal-spacing disposed on the inclined surface, and each of the second balls is protruded from the inclined surface along a second direction which is vertical to the first direction.

7 Claims, 10 Drawing Sheets

(58) Field of Classification Search
USPC ................................. 33/502, 562, 567, 567.1
See application file for complete search history.

(56) References Cited

U.S. PATENT DOCUMENTS

| | | | | |
|---|---|---|---|---|
| 3,723,927 | A * | 3/1973 | Blakey | B23Q 3/1546 |
| | | | | 33/DIG. 1 |
| 4,043,045 | A * | 8/1977 | Rodriguez | G01B 5/242 |
| | | | | 33/537 |
| 4,492,036 | A * | 1/1985 | Beckwith, Jr. | G01B 3/30 |
| | | | | 33/DIG. 1 |
| 4,932,136 | A * | 6/1990 | Schmitz | G01B 21/042 |
| | | | | 73/1.79 |
| 4,962,591 | A * | 10/1990 | Zeller | G01B 21/042 |
| | | | | 73/1.79 |
| 5,097,604 | A | 3/1992 | Brown | |
| 5,329,703 | A * | 7/1994 | Craig | G01B 5/242 |
| | | | | 33/502 |
| 5,647,136 | A * | 7/1997 | Jostlein | G01B 21/042 |
| | | | | 73/1.79 |
| 5,983,512 | A * | 11/1999 | Trapet | G01B 3/30 |
| | | | | 33/502 |
| 6,023,850 | A * | 2/2000 | Trapet | G01B 21/042 |
| | | | | 33/502 |
| 6,505,495 | B1 * | 1/2003 | Blondeau | G01B 1/00 |
| | | | | 73/1.79 |
| 6,598,306 | B2 * | 7/2003 | Eaton | G01B 21/042 |
| | | | | 33/502 |
| 6,681,495 | B2 * | 1/2004 | Masayuki | B25J 17/0266 |
| | | | | 73/1.79 |
| 6,772,619 | B2 | 8/2004 | Nashiki et al. | |
| 6,836,323 | B2 * | 12/2004 | Schmadel | G01B 21/042 |
| | | | | 33/558.2 |
| 7,040,033 | B2 * | 5/2006 | Zhu | G01B 21/042 |
| | | | | 33/502 |
| 7,174,652 | B2 | 2/2007 | McMurtry | |
| 7,246,448 | B2 * | 7/2007 | Lotze | G01B 21/045 |
| | | | | 33/559 |
| 7,900,367 | B2 * | 3/2011 | Sutherland | G01B 21/042 |
| | | | | 33/502 |
| 7,997,001 | B1 * | 8/2011 | Mekid | G01B 21/042 |
| | | | | 33/783 |
| 11,692,801 | B2 * | 7/2023 | Verduin | G01B 3/002 |
| | | | | 33/567.1 |
| 11,781,849 | B2 * | 10/2023 | Asanuma | G01B 5/016 |
| | | | | 33/503 |
| 12,241,737 | B2 * | 3/2025 | Inoue | G01B 5/012 |
| 2009/0307915 | A1 * | 12/2009 | Sutherland | G01B 21/042 |
| | | | | 33/502 |
| 2013/0282329 | A1 * | 10/2013 | Chang | G01B 21/02 |
| | | | | 702/152 |

FOREIGN PATENT DOCUMENTS

| | | |
|---|---|---|
| CN | 101992407 B | 8/2014 |
| CN | 105136031 B | 9/2017 |
| CN | 110418938 B | 1/2022 |
| TW | I378843 B | 12/2012 |
| TW | 201618888 A | 6/2016 |
| TW | M532334 U | 11/2016 |
| TW | I580513 B | 5/2017 |
| TW | I694238 B | 5/2020 |

OTHER PUBLICATIONS

Ji Ping, Evolution of Machine Tool Status Detection Methods Machine Tool Status Detection Methods, CTIMS, 2022.
Wen-Yu Chueh et al., The accuracy measurement and compensation method for high-end machine tools, Journal of the Mechatronic Industry, 2022.
Gwo-Sheng Peng et al., Value-Added Plan for Establishing Measurement Standards for Smart Machinery Industry, Ministry of Economic Affairs 108th Annual Science and Technology Project Implementation Report, 2020.
Xiangru Wu, Study on the Volumetric Accuracy Measurement and compensation of machine tools, Machinery Industry Magazine, 2019, Issue 441.
I-Min Paung, Measurement and improvement of dynamic errors of 5-axis CNC machine too, National Tsinghua University Master's Thesis, 2007.

* cited by examiner

FIVE-AXIS SPACE PRECISION MEASUREMENT FIXTURE

CROSS REFERENCE TO RELATED APPLICATION

This application claims the benefits of Taiwan application Serial No. 112138224, filed on Oct. 5, 2023, the disclosures of which are incorporated by references herein in its entirety.

TECHNICAL FIELD

The present disclosure relates in general to a processing technical field, and more particularly to a five-axis space precision measurement fixture that can rapidly perform precision measurement and compensation upon a five-axis machine tool.

BACKGROUND

Based on the global energy transformation and the demand for five-axis high-precision machining driven by the aerospace industry, in order to save manpower and improve the accuracy of curved surface processing, various countries have invested in the development of five-axis machining equipment so as to enable a workpiece to be clamped only once to complete the entire complex cutting process. For example, transparent Interpolation is performed through spatial geometric operations to improve high-precision and high-quality processing of turbine blades and artificial joints to achieve optimal fluid efficiency and joint fit.

In addition, due to development wave of environmental protection issues such as green energy and energy conservation, technological development of five-axis processing machines is substantially affected to meet market needs of aerospace, energy, medical, transportation and other industries. Through reducing manpower needs, improving processing accuracy, and providing more solutions to problems in production efficiency, competition in the increasingly fierce international processing market can be ensured.

However, with evolution of times and advancement of technology, mire and more consumers and manufacturers have increasingly stringent requirements for the quality and accuracy of the production. Machine tools have gradually developed from traditional three-axis processing machines to five-axis simultaneous motion machines. For high-end machine tools, how to improve product accuracy of high-end machine tools and how to quickly perform accuracy measurement and compensation technology on machine tools are currently issues faced by professionals in the processing field.

In addition, a typical traditional five-axis accuracy measurement method shall integrate expensive equipment such as laser interferometers and pointer gauges with large linear, square or circular testers, to perform measurements for verifying 21 linear-axis errors axis and 22 radial errors of two rotation axes; i.e., a total of 43 error items. As such, the entire measurement and accuracy trimming can be completed. Obviously, the measurement operation is not only a complicated process but also takes up to several days to complete.

Furthermore, human deviations in measurement are unavoidable due to individual operating habits.

Accordingly, how to develop a "five-axis space precision measurement fixture" that can quickly perform precision measurement and compensation on five-axis machine tools is an urgent issue for the skill in the art to solve.

SUMMARY

In one embodiment of this disclosure, a five-axis space precision measurement fixture comprises:

a body, at least having a first surface, a third surface, a fourth surface and an inclined surface, the first surface and the third surface being neighbored and perpendicular to each other, the fourth surface being neighbored with the first surface and the third surface and perpendicular to each of the first surface and the third surface, the inclined surface neighboring the first surface and forming an angle of 45° to the third surface;

a plurality of first-ball screw holes, arranged on the first surface in an equal-spacing manner to form a plurality of rows and a plurality of columns, each row of the plurality of rows being parallel to the third surface, each column of the plurality of columns being perpendicular to the third surface, each of the plurality of first-ball screw holes having an axial direction parallel to a first direction, the first direction being perpendicular to the first surface; and a plurality of second-ball screw holes, arranged on the inclined surface along a tilt direction in an equal-spacing manner, each of the plurality of second-ball screw holes having an axial direction parallel to a second direction, the second direction being perpendicular to the third surface, the second direction and the first direction being perpendicular to each other.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
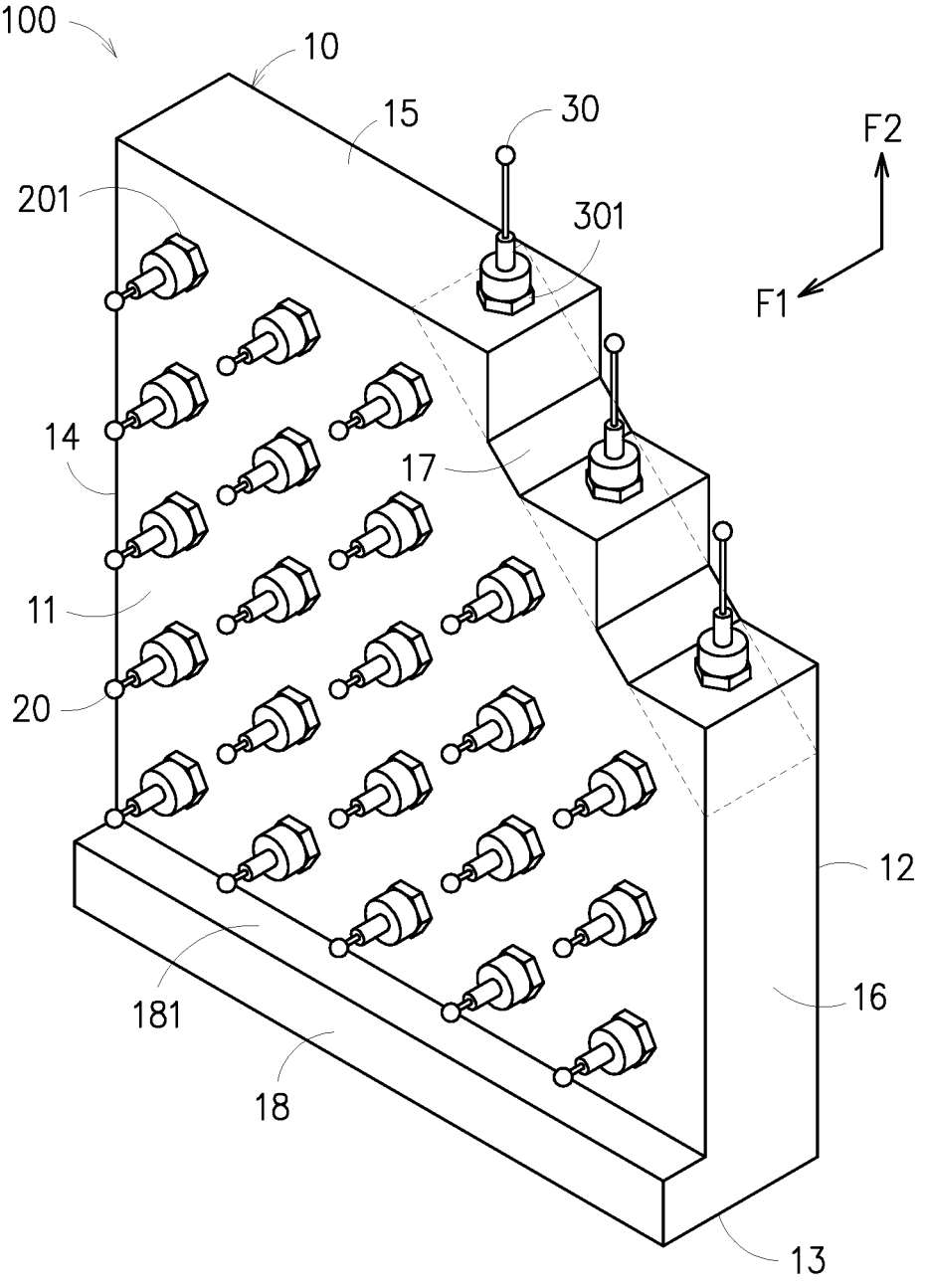
FIG. 1 is a schematic perspective view of an embodiment of this disclosure.
Figure 2:
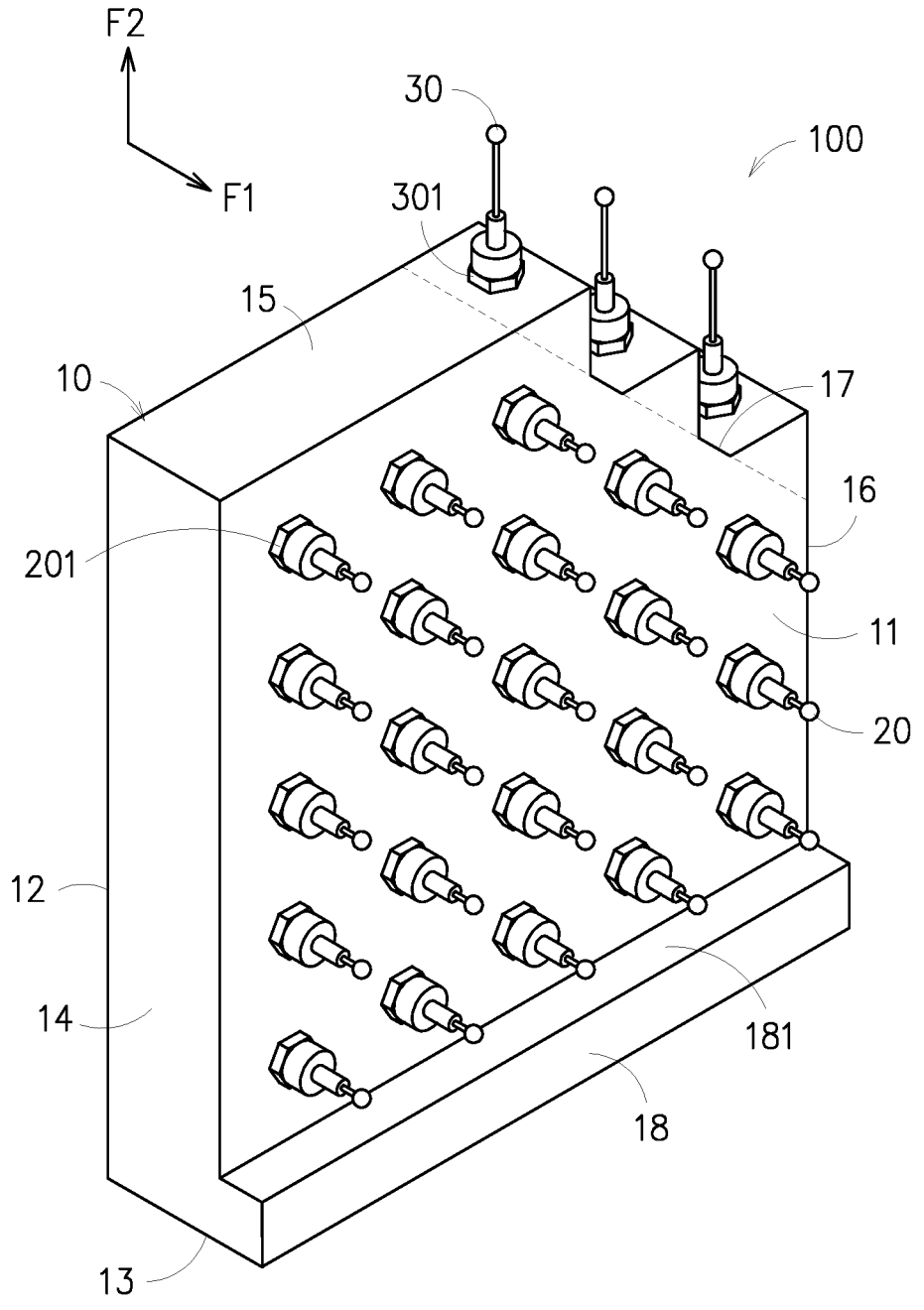
FIG. 2 is another view of FIG. 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1 to FIG. 4, the five-axis space precision measurement fixture 100 of this embodiment includes a body 10, a plurality of first balls 20 and a plurality of second balls 30 both installed on the body 10.

A material of the body 10 can be a low expansion coefficient material, such as granite.

The first ball 20 or the second ball 30 is a probe stylus of a photoelectric sensor module that can be used to perform non-contact photoelectric measurement upon a five-axis machine tool. Regard the aforesaid first ball 20 and second ball 30, please refer to the lens set 20 of Taiwan patent no. 1378843. According to this disclosure, the first ball 20 and the second ball 30 can be included or excluded.

Referring to FIG. 1 to FIG. 4, the body 10 has a first surface 11, a second surface 12, a third surface 13, a fourth surface 14, a fifth surface 15, a sixth surface 16 and an inclined surface 17.

The first surface 11 and the second surface 12 are parallel to each other, and disposed to opposite sides of the third surface 13. The third surface 13 is perpendicular to each of the first surface 11 and the second surface 12. In particular, the first surface 11 is furnished thereon with a plurality of first-ball screw holes 201 for mounting individually a plurality of first-ball screw holes 201 such as screws.

The fourth surface 14 is also disposed between the first surface 11 and the second surface 12, and is directly connected with the third surface 13. The fourth surface 14 is perpendicular to each of the first surface 11, the second surface 12 and the third surface 13.

The fifth surface 15 is disposed oppositely to the third surface 13 on the body 10. The fifth surface 15 and the third surface 13 are parallel to each other. The fifth surface 15 is surrounded by the inclined surface 17, the first surface 11, the second surface 12 and the fourth surface 14. Also, the fifth surface 15 is perpendicular to the first surface 11, the second surface 12 and the fourth surface 14.

The sixth surface 16 is disposed oppositely to the fourth surface 14 on the body 10. The sixth surface 16 and the fourth surface 14 are parallel to each other. The sixth surface 16 is surrounded by the inclined surface 17, the first surface 11, the second surface 12 and the third surface 13. The sixth surface 16 is perpendicular to the first surface 11, the second surface 12 and the third surface 13.

The inclined surface 17 is disposed between the first surface 11 and the second surface 12 by opposing the third surface 13. The inclined surface 17 forms an angle θ1 of 45° with respect to the third surface 13, an angle of 135° with respect to the sixth surface 16, and also an angle θ2 of 135° with respect to the fifth surface 15.

The first surface 11 is separated from the third surface 13 by a flange 18. The flange 18 is protruded from the first surface 11. The flange 18 has a flange surface 181 connected to the first surface 11 by being perpendicular to each other. The flange surface 181, parallel to the third surface 13, has a length L. In this embodiment, the length L is equal to the distance D20 between the fourth surface 14 and the sixth surface 16.

Figure 3:
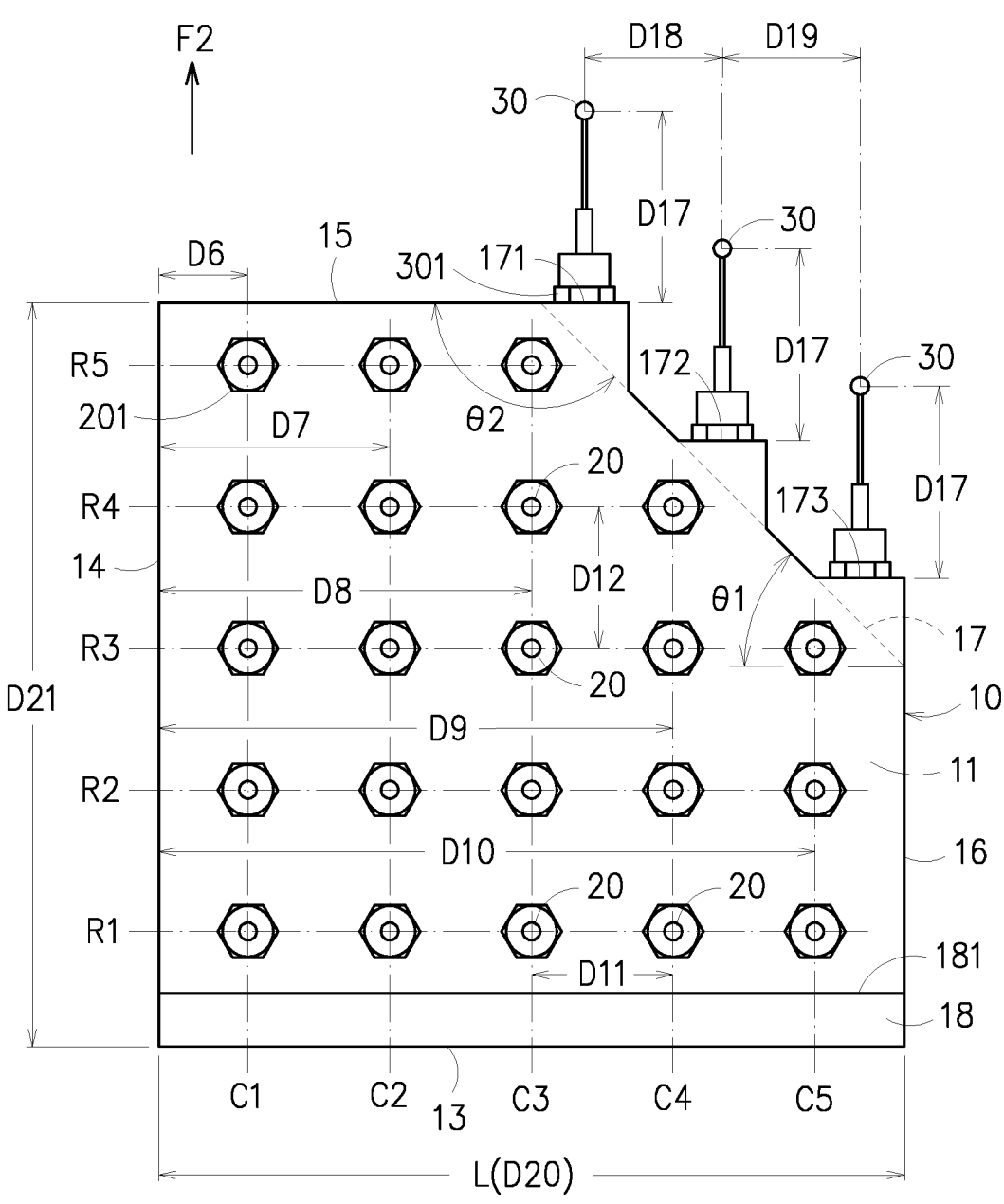
FIG. 3 is a schematic front view of FIG. 1.
Figure 4:
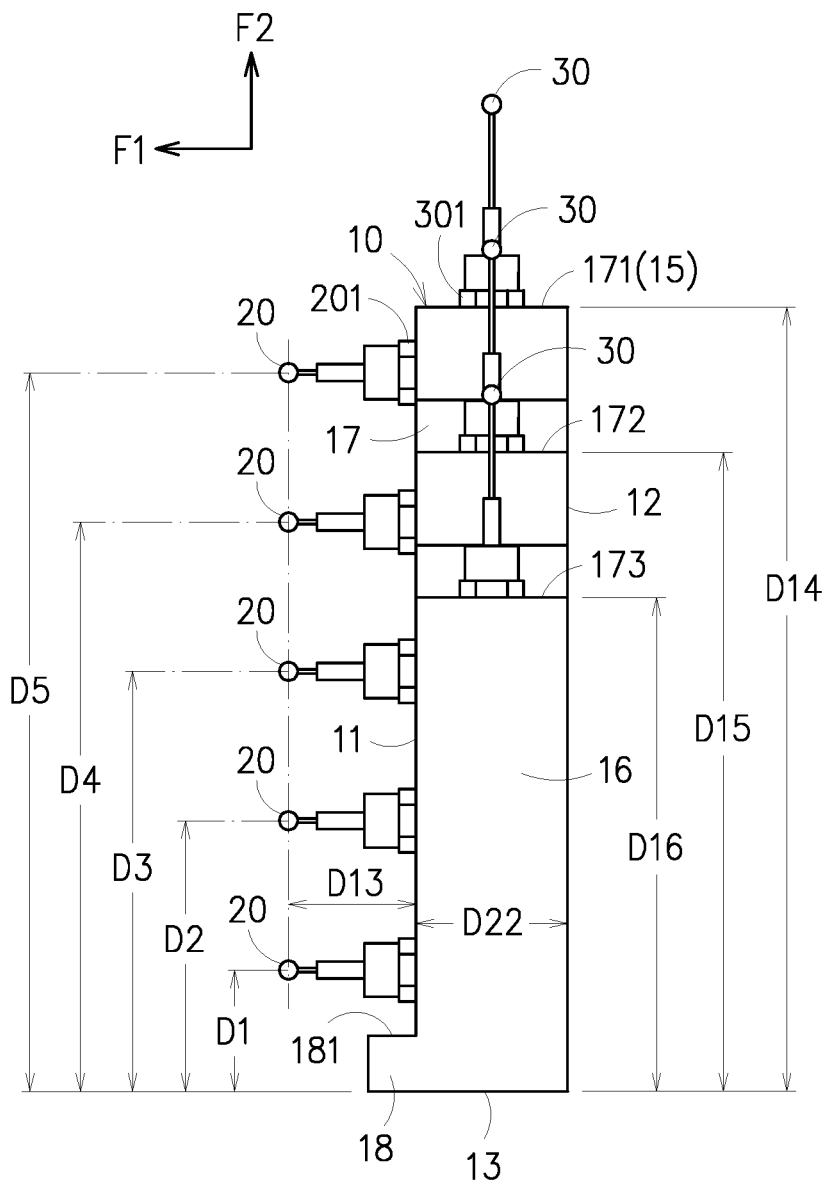
FIG. 4 is a schematic right side view of FIG. 1.

Referring to FIG. 3 and FIG. 4, the first balls 20 are uniformly distributed into an array arrangement on the first surface 11. This array arrangement is composed by a first row R1, a second row R2, a third row R3, a fourth row R4 and a fifth row R5, or a first column C1, a second column C2, a third column C3, a fourth column C4 and a fifth column C5. In this arrangement, any two neighboring first balls 20 are separated by the same inter-center distance. That is, a distance of centers of any two neighboring first-ball screw holes 201 is fixed for all the first-ball screw holes 201. For example, as shown, any two neighboring first balls 20 in the same first row R1 are presented to have a distance D11, any two neighboring first balls 20 in the same third column C3 are presented to have a distance D12, and D11=D12.

An arrangement direction of the first balls 20 in each of the first row R1 to the fifth row R5 is parallel to the third surface 13, and another arrangement direction of the first balls 20 in each of the first column C1 to the fifth column C5 is perpendicular to the third surface 13. Each of the first balls 20 is protruded from the first surface 11 in a normal direction parallel to a first direction F1. The first direction F1, perpendicular to the first surface 11, is also defining each axial direction of the first-ball screw hole 201. Namely, it also implies that a distance between a center of any first ball 20 and the first surface 11 is equal to the same D13.

Distances D1~D5, standing for distances from the first row R1, the second row R2, the third row R3, the fourth row R4 and the fifth row R5, respectively, to the third surface 13, are orderly increased. In this embodiment, each of the first row R1, the second row R2 and the third row R3 is furnished with 5 said first balls 20, the fourth row R4 has 4 said first balls 20, and the fifth row R5 has 3 said first balls 20. Namely, the first row R1, the second row R2 and the third row R3 have the same number of the first balls 20, the number of the first balls 20 in the fourth row R4 is less than that in the third row R3, and the number of the first balls 20 in the fifth row R5 is further less than that in the fourth row R4.

Distances D6~D10, standing for distances from the first column C1, the second column C2, the third column C3, the fourth column C4 and the fifth column C5, respectively, to the fourth surface 14, are orderly increased. In this embodiment, each of the first column C1, the second column C2 and the third column C3 is furnished with 5 said first balls 20, the fourth column C4 has 4 said first balls 20, and the fifth column C5 has 3 said first balls 20. Namely, the first column C1, the second column C2 and the third column C3 have the same number of the first balls 20, the number of the first balls 20 in the fourth column C4 is less than that in the third column C3, and the number of the first balls 20 in the fifth column C5 is further less than that in the fourth column C4.

Referring to FIG. 3 to FIG. 4, the second balls 30 are provided in an equal-spacing manner to the inclined surface along a tilt direction of the inclined surface 17. Along the tilt direction of the inclined surface 17, a first platform 171, a second platform 172 and a third platform 173 are provided. In this embodiment, the fifth surface 15 and the first platform 171 are coplanar. Each of the first platform 171, the second platform 172 and the third platform 173 is parallel to the third surface 13. Distances D14~D16, standing for distances from the first platform 171, the second platform 172 and the third platform 173, respectively, to the third surface 13, are orderly decreased. On each of the first platform 171, the second platform 172 and the third platform 173, at least one second-ball screw hole 301 is provided for mounting the second balls 30. In this embodiment, the second-ball screw hole 301 can be a screw hole.

Each of the second balls 30 is protruded from the inclined surface 17 in a direction parallel to a second direction F2; namely, protruded from the first platform 171, the second platform 172 or the third platform 173 that mounts the corresponding second ball 30. The axial direction of the second-ball screw hole 301 is identical to that of the corresponding second ball 30. The second direction F2, being perpendicular to the third surface 13, is perpendicular to the first direction F1.

The inter-center distances D17 for the second balls 30 on the first platform 171, the second platform 172 and the third platform 173 are all equal.

The inter-center distances D18, D19, standing for the distances of projections of two neighboring said second balls 30 or said second-ball screw holes 301 on the third surface 13 are identical. In particular, the distances D18, D19 and the aforesaid inter-center distances D11 or D12 for neighboring two first balls 20 or two first-ball screw holes 201 are the same.

Referring to FIG. 1 to FIG. 4, dimensions for the body 10 are not limited, but determined according to the dimensions of the real work platform of the five-axis machine tool. For example, if the work platform is a 60 mm-diameter round platform, the distance D20 between the fourth surface 14 and the sixth surface 16 can be 420 mm, the distance D21 between the third surface 13 and the fifth surface 15 can be 420 mm, the distance D22 between the first surface 11 and the second surface 12 can be 80 mm, and the distances D11, D12, D18, D19 can be 80 mm. Further, the numbers of the first balls 20 and the second balls 30 can be adjusted according to practical requirements.

In addition, in the embodiment shown in FIG. 1 to FIG. 4, the third surface 13, the fourth surface 14, the fifth surface 15, the sixth surface 16 and the inclined surface 17 are all rectangular, and the first surface 11 and the second surface 12 are presented to be rectangles with individual chamfers due to the existence of the inclined surface 17. Thereupon, the body 10 presents largely a 3D rectangular block structure. However, according to this disclosure, the body 10 is not limited thereto, but to practical design needs.

Referring to FIG. 5 to FIG. 13, it is shown that the five-axis space precision measurement fixture 100 of this disclosure is applied onto a work platform 200 for performing versatile measurements. The work platform 200 is parallel to the XY plane, such as a work platform of a five-axis machine tool. In FIG. 5 through FIG. 13, all the work platforms 200 are round, and each of the work platforms 200 may have a 600 mm diameter, but not limited thereto.

Figure 5:
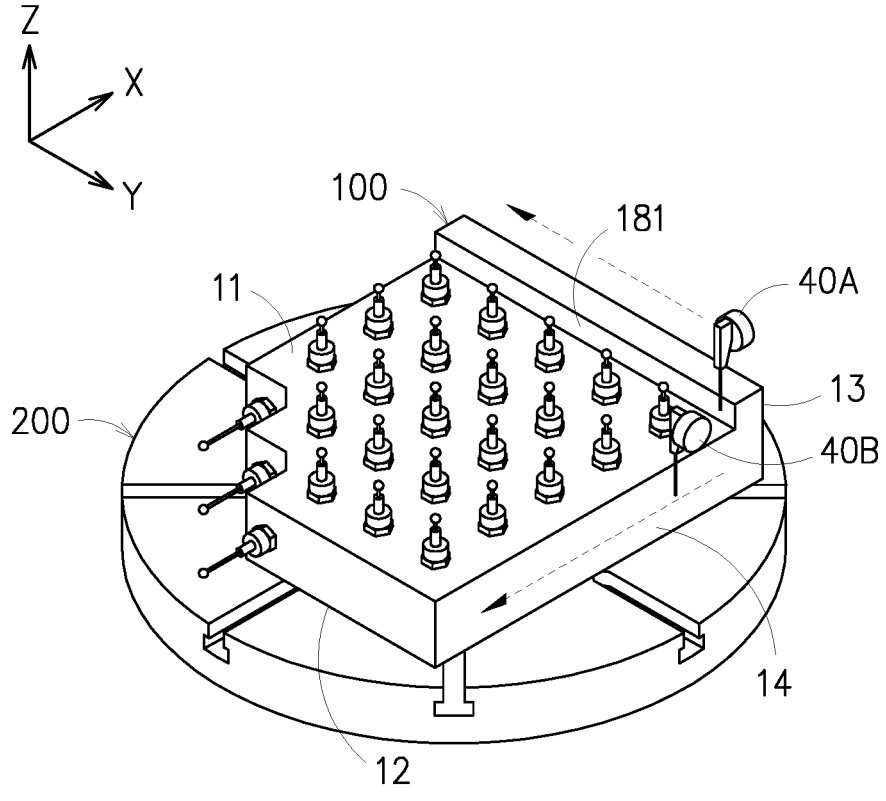
FIG. 5 demonstrates schematically an application of the embodiment of FIG. 1 in performing verticality measurement upon an XY plane of a work platform.

Referring to FIG. 5, the five-axis space precision measurement fixture 100 is arranged on the work platform 200 by having the second surface 12 to face the work platform 200. The first surface 11 is parallel to the XY plane, the fourth surface 14 is parallel to the ZX plane, and the third surface 13 is parallel to the ZY plane. By adhering a diameter-type measuring meter 40A to the flange surface 181 so as to move along the Y axis and another diameter-type measuring meter 40B to the fourth surface 14 so as to move along the X axis, then an XY plane verticality measurement upon the work platform 200 can be performed. Further, according to the measurement results, corresponding error analysis and compensation can be followed. It is noted that the diameter-type measuring meter 40A or the diameter-type measuring meter 40B is not disclosed in this disclosure.

Figure 6:
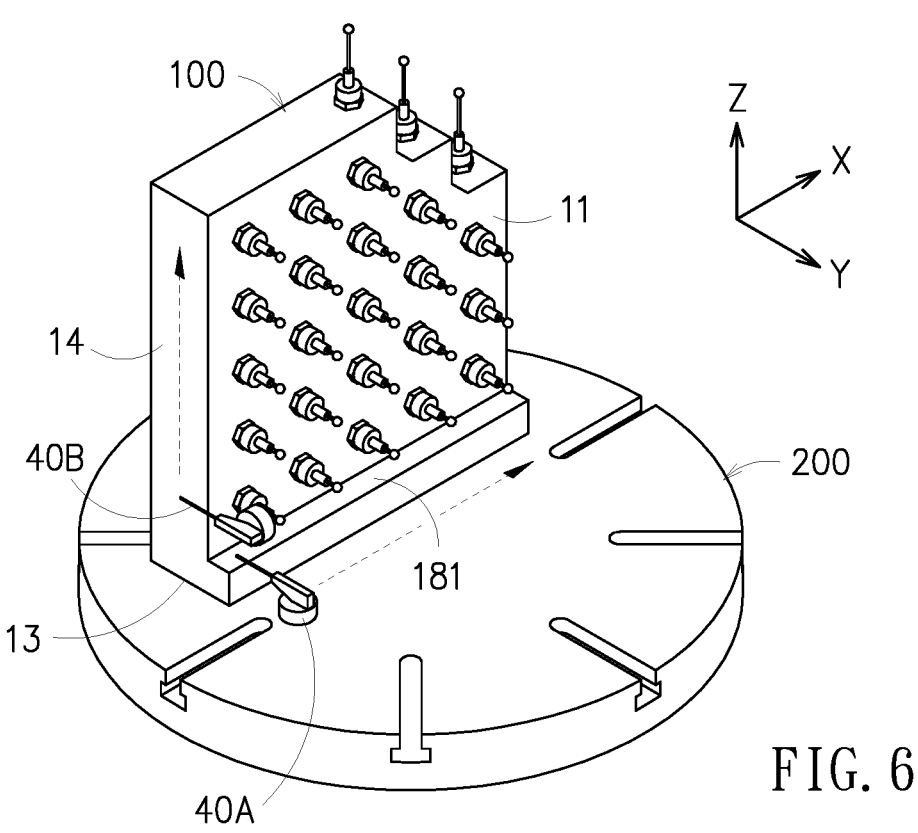
FIG. 6 demonstrates schematically an application of the embodiment of FIG. 1 in performing verticality measurement upon an ZY plane of the work platform.

Referring to FIG. 6, the five-axis space precision measurement fixture 100 is arranged on the work platform 200 by having the third surface 13 to face the work platform 200. The first surface 11 is parallel to the ZX plane, the third surface 13 is parallel to the XY plane, and the fourth surface 14 is parallel to the ZY plane. By adhering the diameter-type measuring meter 40A to the flange surface 181 so as to move along the X axis and the diameter-type measuring meter 40B to the fourth surface 14 so as to move along the Z axis, then a ZY plane verticality measurement upon the work platform 200 can be performed. Further, according to the measurement results, corresponding error analysis and compensation can be followed.

Figure 7:
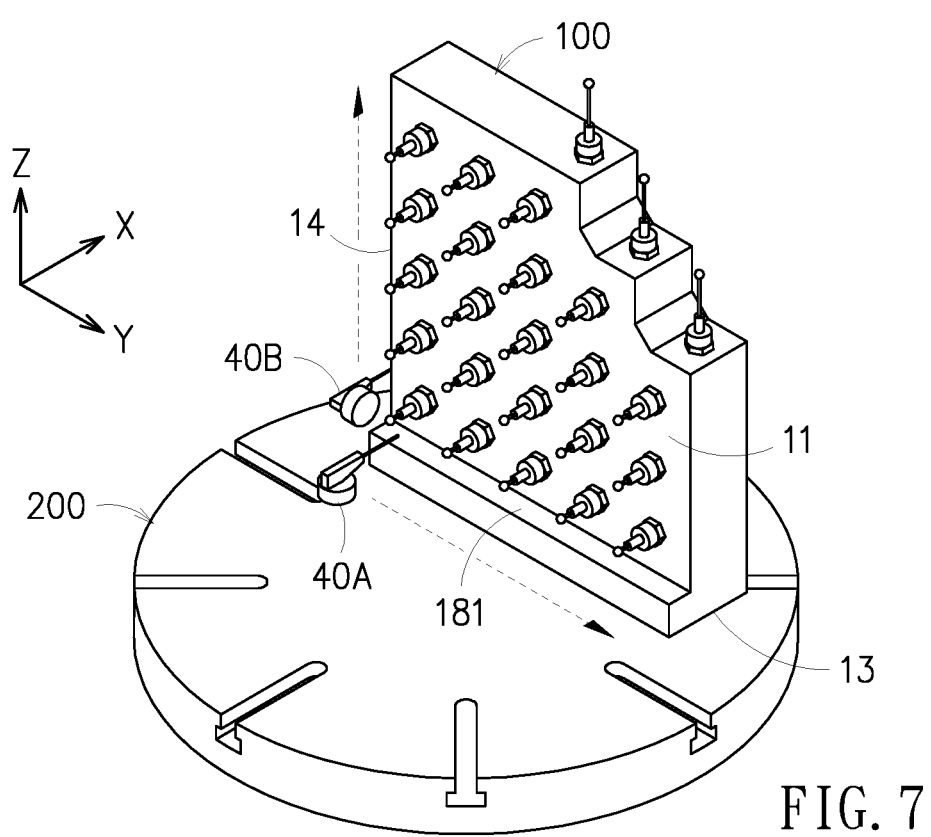
FIG. 7 demonstrates schematically an application of the embodiment of FIG. 1 in performing verticality measurement upon a ZX plane of the work platform.

Referring to FIG. 7, the five-axis space precision measurement fixture 100 is arranged on the work platform 200 by having the third surface 13 to face the work platform 200. The first surface 11 is parallel to the ZY plane, the third surface 13 is parallel to the XY plane, and the fourth surface 14 is parallel to the ZX plane. By adhering the diameter-type measuring meter 40A to the flange surface 181 so as to move along the Y axis and the diameter-type measuring meter 40B to the fourth surface 14 so as to move along the Z axis, then a ZX plane verticality measurement upon the work platform 200 can be performed. Further, according to the measurement results, corresponding error analysis and compensation can be followed.

Figure 8:
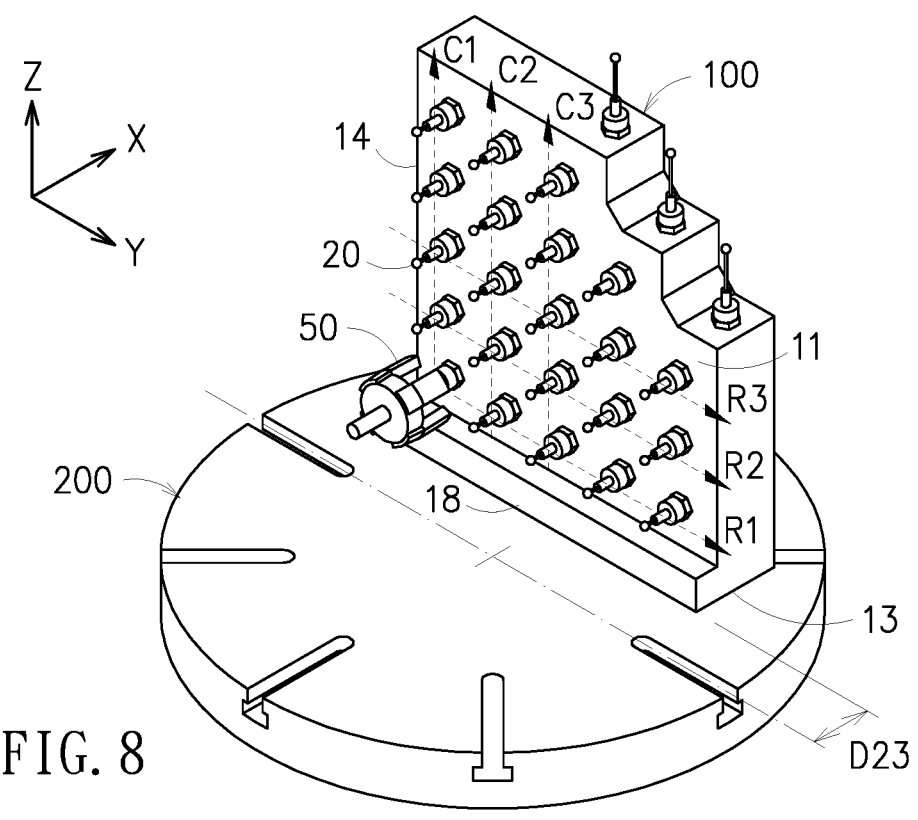
FIG. 8 and FIG. 9 demonstrate schematically together an application of the embodiment of FIG. 1 in performing ZY positioning accuracy measurement upon the work platform.
Figure 9:
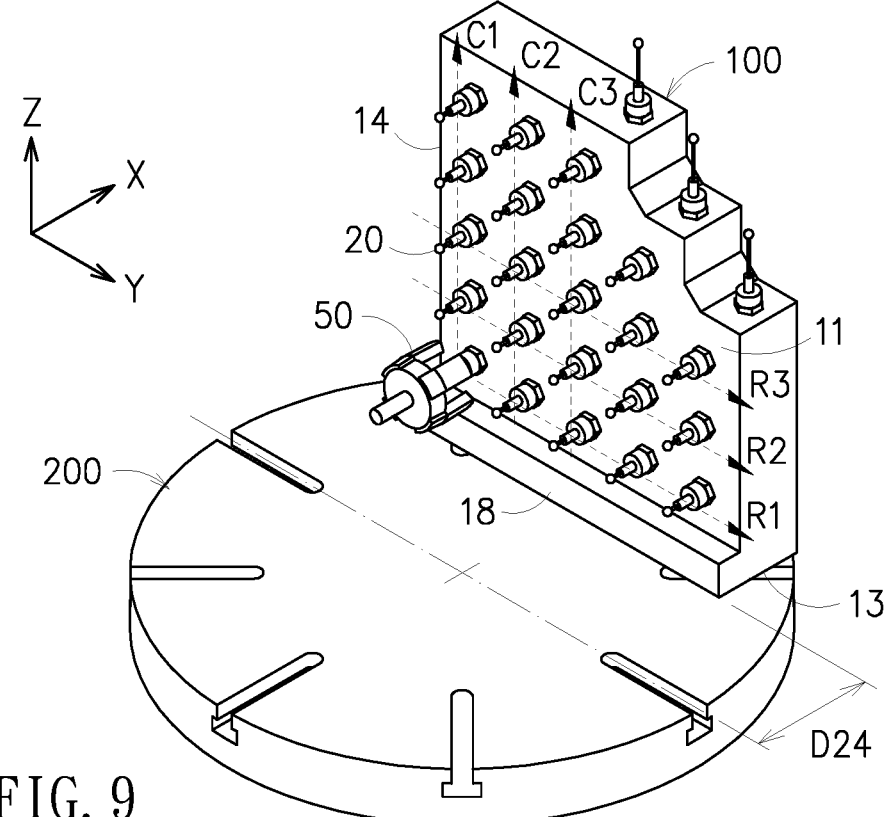

Referring to FIG. 8 and FIG. 9, the five-axis space precision measurement fixture 100 is arranged on the work platform 200 by having the third surface 13 to face the work platform 200. The first surface 11 is parallel to the ZY plane, the third surface 13 is parallel to the XY plane, and the fourth surface 14 is parallel to the ZX plane. In FIG. 8, the linear distance from the flange 18 to a center of the work platform 200 is D23. In FIG. 9, the linear distance from the flange 18 to the center of the work platform 200 is D24, and D24>D23. For example, the distance D23 is 150 mm, and the distance D24 is 300 mm; but not limited thereto.

Utilize a photoelectric measurement module 50 parallel to the Y axis to perform measurements upon each said first ball 20 in the first row R1, the second row R2 and the third row R3. In addition, the photoelectric measurement module 50 parallel to the Y axis is utilized to perform measurements upon each of the first balls 20 in the first column C1, the second column C2 and the third column C3. By summarizing the measurement results of FIG. 8 and FIG. 9, a ZY positioning accuracy measurement upon the work platform 200 can be performed. Further, according to the measurement results, corresponding error analysis and compensation can be followed. Regard the photoelectric measurement module 50, please refer to the sensor probe 10 of Taiwan patent no. 1378843. According to this disclosure, the photoelectric measurement module 50 is not described.

Figure 10:
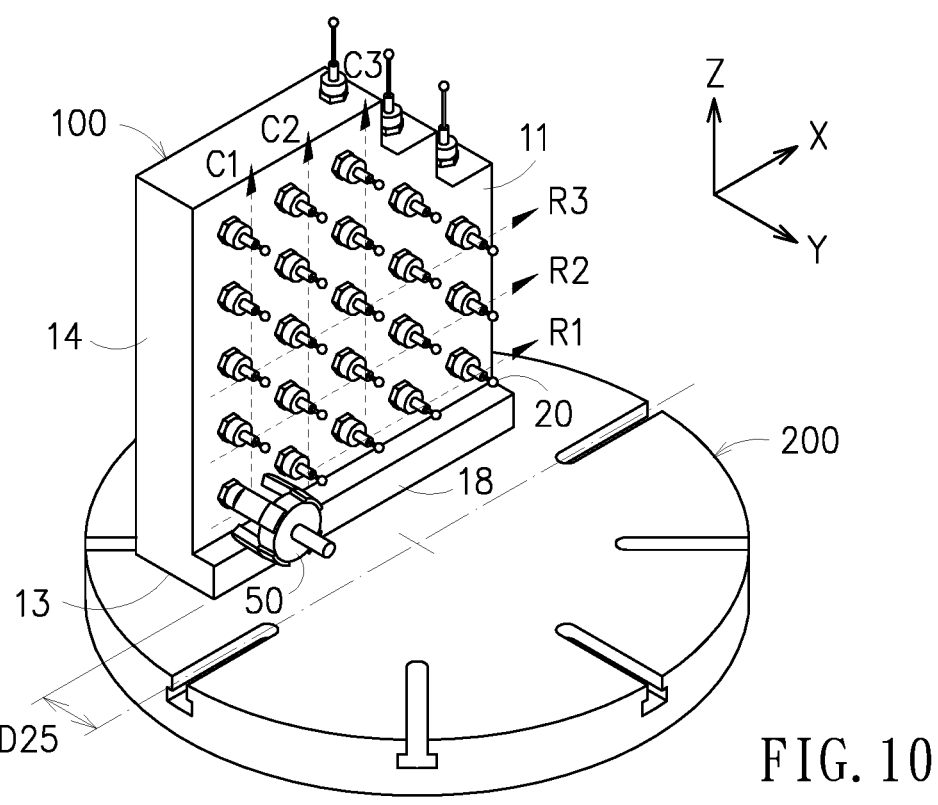
FIG. 10 and FIG. 11 demonstrate schematically together an application of the embodiment of FIG. 1 in performing ZX positioning accuracy measurement upon the work platform.
Figure 11:
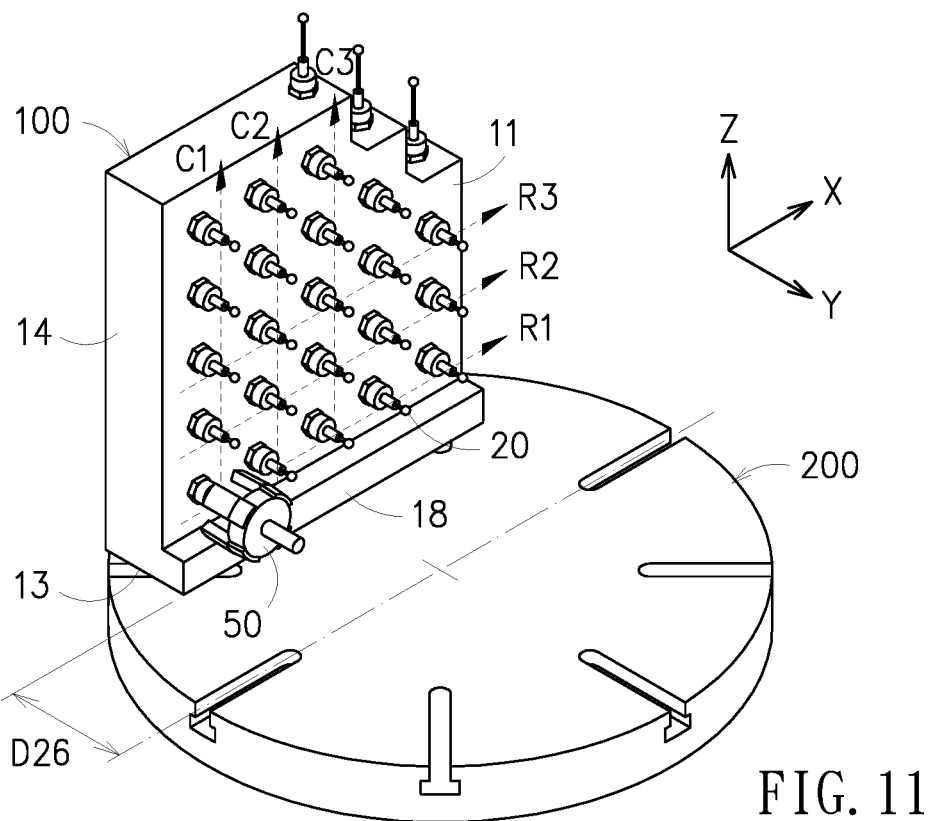

Referring to FIG. 10 and FIG. 11, the five-axis space precision measurement fixture 100 is arranged on the work platform 200 by having the third surface 13 to face the work platform 200. The first surface 11 is parallel to the ZX plane, the third surface 13 is parallel to the XY plane, and the fourth surface 14 is parallel to the ZY plane. In FIG. 10, the linear distance from the flange 18 to a center of the work platform 200 is D25. In FIG. 9, the linear distance from the flange 18 to the center of the work platform 200 is D26, and D26>D25. For example, the distance D25 is 150 mm, and the distance D26 is 300 mm; but not limited thereto.

Utilize the photoelectric measurement module 50 parallel to the X axis to perform measurements upon each said first ball 20 in the first row R1, the second row R2 and the third row R3. In addition, the photoelectric measurement module 50 parallel to the Z axis is utilized to perform measurements upon each of the first balls 20 in the first column C1, the second column C2 and the third column C3. By summarizing the measurement results of FIG. 10 and FIG. 11, a ZX positioning accuracy measurement upon the work platform 200 can be performed. Further, according to the measurement results, corresponding error analysis and compensation can be followed.

Figure 12:
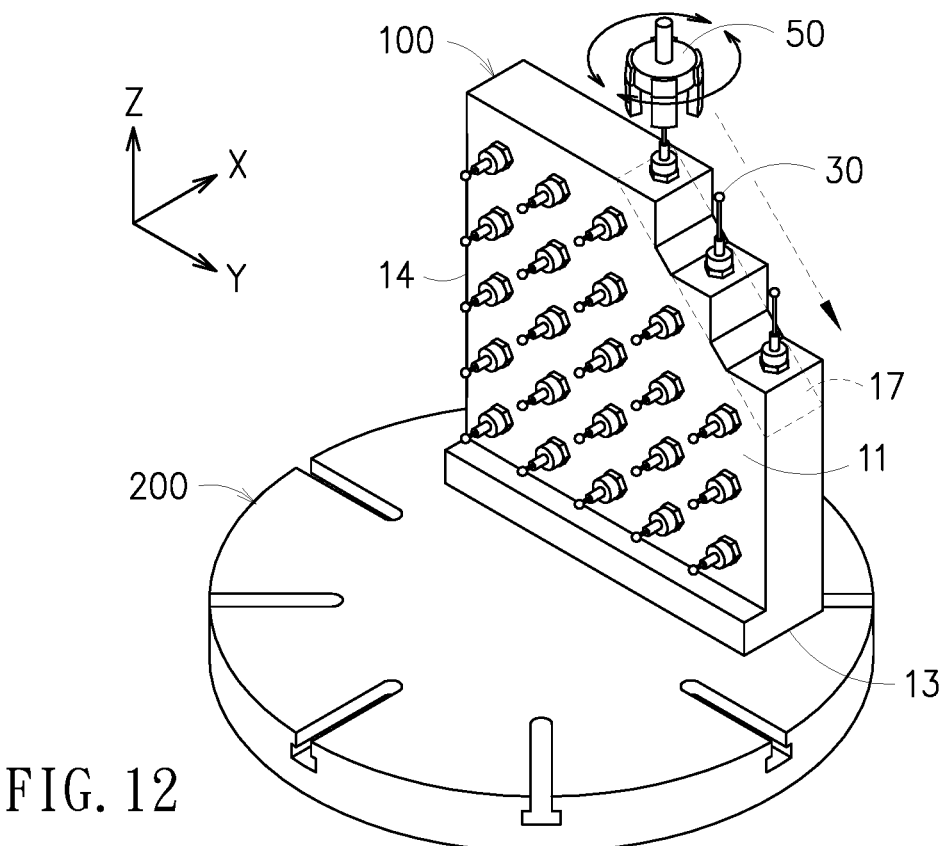
FIG. 12 demonstrates schematically an application of the embodiment of FIG. 1 in performing inclined surface positioning accuracy measurement.

Referring to FIG. 12, the five-axis space precision measurement fixture 100 is arranged on the work platform 200 by having the third surface 13 to face the work platform 200. The first surface 11 is parallel to the ZY plane, the third surface 13 is parallel to the XY plane, and the fourth surface 14 is parallel to the ZX plane. Utilize the photoelectric measurement module 50 parallel to the inclined surface 17 to perform measurements upon each said second ball 30, and further an inclined surface positioning accuracy measurement upon the work platform 200 can be performed. Further, according to the measurement results, corresponding error analysis and compensation can be followed.

Figure 13:
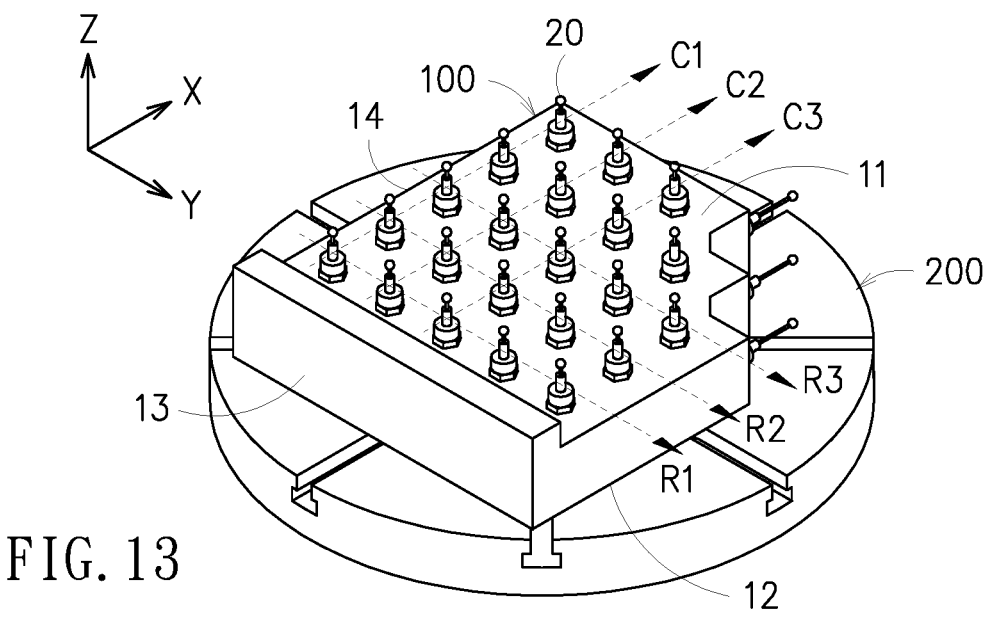
FIG. 13 demonstrates schematically an application of the embodiment of FIG. 1 in measuring pitch, roll, yaw and precision with respect to the XY plane of the work platform.

Referring to FIG. 13, the five-axis space precision measurement fixture 100 is arranged on the work platform 200 by having the second 12 to face the work platform 200. The first surface 11 is parallel to the XY plane, the fourth surface 14 is parallel to the ZX plane, and the third surface 13 is parallel to the ZY plane.

Utilize three diameter-type measuring meters (not shown in the figure) parallel to the Y axis to perform measurements upon each said first ball 20 in the first row R1, the second row R2 and the third row R3. In addition, these three diameter-type measuring meters (not shown in the figure) parallel to the X axis are further utilized to perform measurements upon each said first ball 20 in the first column C1, the second column C2 and the third column C3. By summarizing the measurement results, precision measurements upon pitch, roll and yaw with respect to the XY plane of the work platform 200 can be performed. Further, according to the measurement results, corresponding error analysis and compensation can be followed.

Similarly, to perform precision measurements upon pitch, roll and yaw with respect to the XZ and YZ planes of the work platform 200, the five-axis space precision measurement fixture 100 shown in FIG. 6 and FIG. 7 shall be arranged onto the work platform 200, then three said diameter-type measuring meters will be applied to perform measurements upon each said first ball 20 in the first row R1, the second row R2, the third row R3, the first column C1, the second column C2 and the third column C3, and so corresponding error analysis and compensation can be followed according to the measurement results.

Figure 14:
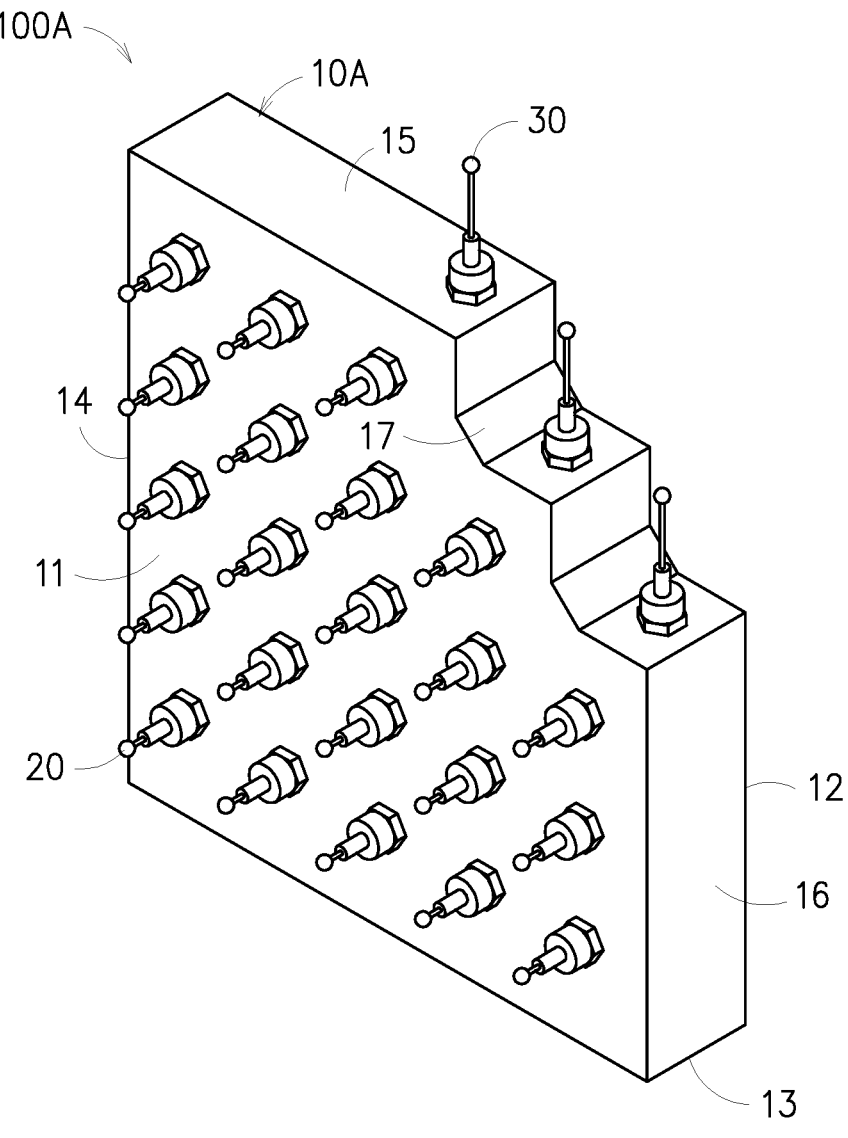
FIG. 14 is a schematic perspective view of another embodiment of this disclosure.

It shall be explained that the inclusion of the flange 18 is optional, but up to practical needs. If the test items include only those listed in FIGS. 8~12, then the body 10 may waive the flange 18. In the embodiment shown in FIG. 14, the five-axis space precision measurement fixture 100A includes a body 10A, a plurality of first balls 20 and a plurality of second balls 30. The body 10A has a first surface 11, a second surface 12, a third surface 13, a fourth surface 14, a fifth surface 15, a sixth surface 16 and an inclined surface 17.

In summary, the five-axis space precision measurement fixture provided in this disclosure includes a specially designed shape structure to mount a plurality of first balls and a plurality of second balls into special positions, so that different measuring tools can be applied to measure three-axis straightness and motion angle error, polyhedral positioning accuracy and rotational geometric error measurement. With a single positioning manipulation, multiple sets of data can be measured. Not only simplifying the process, avoiding human measurement errors, improving measurement accuracy, and effectively speeding up measurement efficiency, but the cost of laser equipment can be also significantly reduced.

Different from the conventional method of using a mechanism chain model to calculate each position error value in space, this disclosure uses the accuracy of actual measurement points to accumulate multiple sets of measurement data cyclically to achieve a spatial grid point compensation method to achieve the optimal accuracy error correction.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A five-axis space precision measurement fixture, comprising:

a body, at least having a first surface, a third surface, a fourth surface and an inclined surface, the first surface and the third surface being neighbored and perpendicular to each other, the fourth surface being neighbored with the first surface and the third surface and perpendicular to each of the first surface and the third surface, the inclined surface neighboring the first surface and forming an angle of 45° to the third surface;

a plurality of first-ball screw holes, arranged on the first surface in an equal-spacing manner to form a plurality of rows and a plurality of columns, each row of the plurality of rows being parallel to the third surface, each column of the plurality of columns being perpendicular to the third surface, each of the plurality of first-ball screw holes having an axial direction parallel to a first direction, the first direction being perpendicular to the first surface; and a plurality of second-ball screw holes, arranged on the inclined surface along a tilt direction in an equal-spacing manner, each of the plurality of second-ball screw holes having an axial direction parallel to a second direction, the second direction being perpendicular to the third surface, the second direction and the first direction being perpendicular to each other.

2. The five-axis space precision measurement fixture of claim 1, wherein an inter-center distance of any two neighboring first-ball screw holes in the plurality of rows is equal to an inter-center distance of any two neighboring first-ball screw holes in the plurality of columns.

3. The five-axis space precision measurement fixture of claim 1, wherein an inter-center distance of any two neighboring projections on the third plane from the plurality of second-ball screw holes is equal an inter-center distance of any two neighboring projections on the third plane from the plurality of first-ball screw holes.

4. The five-axis space precision measurement fixture of claim 1, wherein the inclined surface has a plurality of platform surfaces arranged along the tilt direction, the plurality of platform surfaces are parallel to the third surface in decreasing spacing, and each of the plurality of platform surfaces is provided with one said second-ball screw hole.

5. The five-axis space precision measurement fixture of claim 4, wherein said second-ball screw holes on the plurality of platform surfaces are arranged to have the same inter-center distance.

6. The five-axis space precision measurement fixture of claim 1, wherein the first surface and the third surface are connected by a flange, the flange is protruded from the first surface, the flange has a flange surface, the flange surface and the first surface are connected and perpendicular to each other, and the flange surface is parallel to the third surface and has a length.

7. The five-axis space precision measurement fixture of claim 1, wherein the plurality of first-ball screw holes and the plurality of second-ball screw holes are used to mount a plurality of first balls and a plurality of second balls, respectively, and heights of the plurality of first balls on the first surface are equal.

\* \* \* \* \*